May 6, 1969     L. L. MEYER     3,443,126

SINE WAVE TO SQUARE WAVE SHAPING CIRCUIT

Filed May 31, 1966

*INVENTOR.*
LAWRENCE L. MEYER

BY

HIS ATTORNEY

United States Patent Office 3,443,126
Patented May 6, 1969

3,443,126
SINE WAVE TO SQUARE WAVESHAPING CIRCUIT
Lawrence L. Meyer, Houston, Tex., assignor to General Electric Company, a corporation of New York
Filed May 31, 1966, Ser. No. 553,898
Int. Cl. H03k 5/08
U.S. Cl. 307—261                3 Claims The present invention relates to a squaring circuit and more particularly to a circuit for converting a sinusoid to a constant amplitude square wave.

When a sine wave is squared for the purpose of marking a period of time equal to a period or periods of the sinusoid, errors often develop because the square wave is not of constant amplitude. This problem of maintaining a constant amplitude square wave is manifest at the zero crossing point of the sinusoid since when the sinusoid is rectified, there is a substantially zero voltage input to the squaring circuit at the zero crossing point causing each square wave pulse generated to have a dip to zero at its midpoint. This midway dip in the waveshape renders the signal unreliable for timing purposes.

The present invention is directed to a circuit which eliminates the zero crossing abberation in the shape of the square wave by providing means for storing the first half of the sinusoidal signal and for applying this stored portion to the squaring circuit during the zero crossing. It is, accordingly, an object of the present invention to provide a squaring circuit providing a substantially constant output for a varying single cycle input.

Another object of the present invention is to provide a squaring circuit having signal storage to avoid variations in the amplitude of the square wave generated.

When the output of the squaring circuit is used for timing purposes, it is essential that the signal stretching function, which the energy storage means performs on the first half cycle of the sinusoid, is not repeated for the second half cycle. It is, therefore, another object of the present invention to provide a squaring circuit having means to insure that the correction of the waveform is complete within each cycle.

A further object of the present invention is to provide a squaring circuit in which the energy storage means for eliminating the center dip in the square wave is discharged during each cycle.

Figure 1:
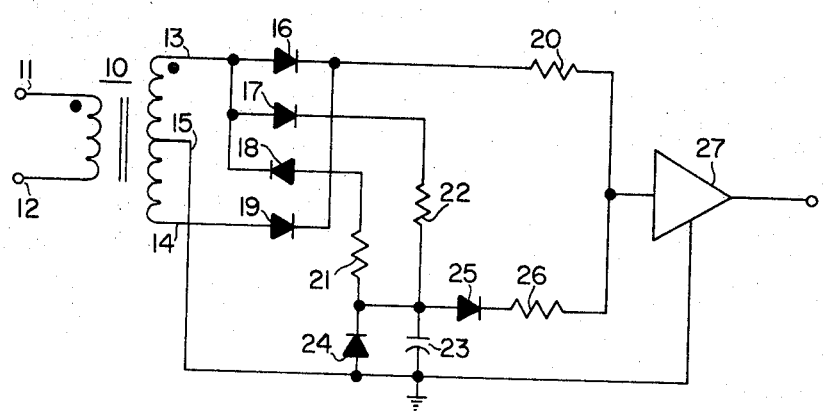
Figure 3:
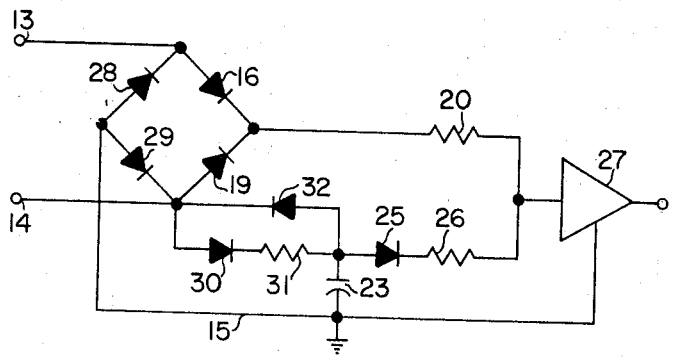
Figure 2:
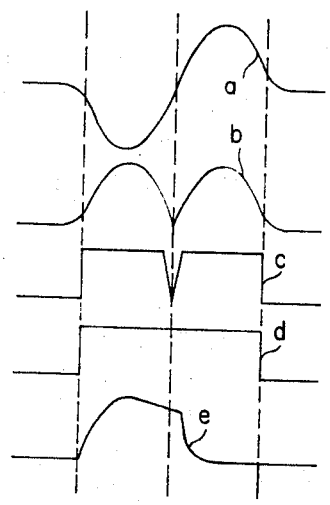

These and other objects and advantages of the present invention will become more readily apparent from a detailed description of the invention as illustrated in the accompanying drawings, in which:

FIGURE 1 is a circuit diagram of one embodiment of the squaring circuit;
FIGURE 2 shows voltage waveforms taken at different points in the circuit; and
FIGURE 3 is a circuit diagram of another embodiment of the invention.

Referring now to the drawings wherein like characters refer to like parts throughout, there is shown in FIGURE 1 a squaring circuit having an input transformer 10 to which a sinusoid such as is shown in FIGURE 2a may be fed. This transformer has primary winding input terminals 11 and 12 and a secondary winding with terminals 13 and 14 and a grounded center tap 15. The dots shown at the upper end of each transformer winding indicate the polarity of voltages appearing on these windings, e.g., when the voltage is positive on lead 11, lead 13 will also be positive with respect to lead 14. Diodes 16 and 19 are connected respectively to the output leads 13 and 14 of the transformer to form a full-wave rectifier. The sine wave rectified by these diodes, as shown in FIGURE 2b, is coupled by resistor 20 to a squaring device such as high gain amplifier 27 which is biased to saturation by the rectified sine wave to produce the square wave output shown in FIGURE 2c.

To eliminate the center dip in the square wave produced by amplifier 27, energy storage means is provided. The energy storage means shown in FIGURE 1 includes a capacitor 23 which is charged by the first half cycle of the sinusoid via diode 17 and resistor 22. Diode 17 is oriented with its anode connected to terminal 13 of the transformer since the first half cycle of the sinusoid is positive. The signal stored by capacitor 23 is delivered to the squaring device by diode 25 and resistor 26. At the zero crossing point of the sinusoid, when the amplitude of the signal applied to amplifier 27 by the full-wave rectifier begins to fall off, diode 25 is forward biased and conducts to apply the voltage on the capacitor to amplifier 27, thereby maintaining the voltage level at the input to the squaring device during this critical period to eliminate the midcycle dip in the square wave.

When the output of the squaring circuit is used for timing purposes, the period of the square wave must not extend beyond the period of the sinusoid. Therefore, means to discharge the capacitor during the second half cycle of the sinusoid is provided so that this portion is not also extended beyond its normal duration. Diode 18 and resistor 21 provide a path for discharging capacitor 23 during the second half cycle of the sinusoid. The cathode of diode 18 is connected to terminal 13 of the transformer and when the sinusoid begins its negative second half cycle, this diode conducts to permit capacitor 23 to discharge through this diode, resistor 21 and the upper portion of the secondary winding of transformer 10 to the ground lead 15. Diode 24, coupled cathode to capacitor 23 and anode to ground, substantially prevents the charge on the capacitor from going negative during the second negative half cycle.

FIGURE 2 shows in addition to the sinusoidal input wave a, the rectified wave b, and the output square wave c with the dip which is experienced without compensation, the square wave output with compensation in curve d and the voltage across the capacitor 23, shown in curve e. Curve e indicates that the capacitor voltage builds up and follows the waveshape of the input sinusoid until the sinusoid falls below the voltage stored by the capacitor and then diode 25 begins to conduct. At this time the capacitor discharges at a rate controlled by resistor 26 and the input impedance of amplifier 27. The rate of discharge is slow since the object is to maintain the voltage input to the amplifier until the second half of the sinusoid has built up to a substantial value. At this time of second half-cycle voltage buildup, terminal 13 of the transformer has swung negative and diode 18 conducts to rapidly discharge the capacitor.

FIGURE 3 shows another embodiment of the squaring circuit of the present invention. The input transformer is not shown in this figure; however, it is noted that an input transformer here would not need to have a center-tap secondary winding as a symmetrical ground is provided by the bridge rectifier. In addition, this circuit differs from that shown in FIGURE 1 in that it is adapted for use with a sinusoid that is 180 degrees out of phase with that shown in FIGURE 2a. Here again, diodes 16 and 19 serve to rectify the sinusoid and to apply a signal such as shown in FIGURE 2b through resistor 20 to squaring means 27, diodes 28 and 29 providing the return path for the current. When terminal 13 is positive with respect to terminal 14, diodes 16 and 29 in the bridge circuit conduct, diode 29 providing the return path from the squaring device via conductor 15 to terminal 14. When terminal 14 is positive with respect to terminal 13 diodes 19 and 28 conduct, diode 28 providing the return path to terminal 13. Diode 25 and resistor 26 again serve to couple the signal stored by capacitor 23 to the high gain amplifier 27 whenever the signal amplitude at the input to this amplifier falls below the amplitude of the signal stored by the capacitor. The capacitor charge is built up during the first half cycle of the sinusoid when terminal 14 is positive and diode 30 and resistor 31 couple the first half cycle of the sinusoid to the capacitor.

The discharge of capacitor 23 is provided in the circuit of FIGURE 3 by diodes 32 and 29 to the ground lead 15. Diode 32 is forward biased by the positive voltage on the capacitor while diode 29 is biased to conduction by the positive voltage on terminal 13. It is noted that during the second half cycle of the sinusoid, terminal 13 is positive and diode 29 is conducting as part of the bridge rectifier. Thus, diode 29 is in its low impedance state during the second half cycle and the current flowing through the diode is merely the return flow of the rectified current minus the discharge of the capacitor current from diode 32.

While the similarities between the circuits of FIGURES 1 and 3 are more pronounced than the differences, the circuit in FIGURE 1 requires fewer diodes to accomplish the same results as the circuit in FIGURE 3 and the latter circuit does not require a center-tapped secondary winding in the input transformer.

What is claimed and desired to be secured by Letters Patent of the United States is:

1. A circuit for squaring a sinusoid comprising a rectifier for rectifying said sinusoid, squaring means coupled to said rectifier to produce a square wave having a period equal to that of said sinusoid, signal storage means, means coupling the first half cycle of said sinusoid to said signal storage means, means coupling the signal stored by said signal storage means to said squaring means whenever the amplitude of the stored signal exceeds the amplitude of the output of said rectifier, and means for discharging said signal storage means during the second half cycle of said sinusoid.

2. A circuit for squaring a sinusoid comprising rectifying means for rectifying said sinusoid, squaring means coupled to said rectifying means to produce a square wave having a period equal to that of said sinusoid, signal storage means, first polarity sensitive means coupling the first half cycle of said sinusoid to said signal storage means, second polarity sensitive means coupled to said signal storage means to discharge same during the second half cycle of said sinusoid, and third polarity sensitive means coupling the signal stored by said signal storage means to said squaring means when said sinusoid is at the mid-cycle zero crossing point to maintain said square wave output at a constant amplitude throughout said period.

3. A circuit as recited in claim 2 wherein said first polarity sensitive means includes a rectifier oriented to conduct during the first half cycle of said sinusoid, said second polarity sensitive means includes a rectifier oriented to conduct during the second half cycle of said sinusoid, and said third polarity sensitive means includes a rectifier oriented to conduct whenever the amplitude of the signal applied to said squaring means by said rectifying means falls below the amplitude of the signal stored by said signal storage means.

References Cited

UNITED STATES PATENTS 3,117,243    1/1964    Fahl _____ 328—26 X

ARTHUR GAUSS, *Primary Examiner.*

B. P. DAVIS, *Assistant Examiner.*

U.S. Cl. X.R.

307—317